US012438679B2

(12) United States Patent
Huang et al.

(10) Patent No.: US 12,438,679 B2
(45) Date of Patent: Oct. 7, 2025

(54) DEFERRAL OF SPS HARQ-ACK WITH DIFFERENT PRIORITIES

(71) Applicant: QUALCOMM Incorporated, San Diego, CA (US)

(72) Inventors: Yi Huang, San Diego, CA (US); Konstantinos Dimou, New York, NY (US); Peter Gaal, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 422 days.

(21) Appl. No.: 17/932,568

(22) Filed: Sep. 15, 2022

(65) Prior Publication Data

US 2023/0141262 A1 May 11, 2023

Related U.S. Application Data

(60) Provisional application No. 63/278,032, filed on Nov. 10, 2021.

(51) Int. Cl.
*H04L 5/00* (2006.01)
*H04W 72/21* (2023.01)

(52) U.S. Cl.
CPC .......... *H04L 5/0064* (2013.01); *H04L 5/0055* (2013.01); *H04W 72/21* (2023.01)

(58) Field of Classification Search
CPC ... H04L 5/0064; H04L 5/0055; H04L 1/1854; H04L 1/1887; H04L 5/0057; H04W 72/21; H04W 72/11; H04W 72/56
See application file for complete search history.

(56) References Cited

U.S. PATENT DOCUMENTS

| | | | | |
|---|---|---|---|---|
| 2018/0049193 | A1* | 2/2018 | Belleschi | H04W 72/0446 |
| 2019/0223195 | A1* | 7/2019 | Lu | H04W 72/569 |
| 2019/0261361 | A1* | 8/2019 | Xiong | H04W 72/02 |

FOREIGN PATENT DOCUMENTS

EP 3582563 12/2019

OTHER PUBLICATIONS

SONY: "Remaining issues in HARQ-ACK 1-5, enhancements for URLLC", 8-12, 3GPP Draft; R1-2111390, 3rd Generation, Partnership Project (3GPP), Mobile Competence Centre ; 650, Route Des Lucioles ; F-06921 Sophia-Antipolis Cedex; France, vol. RAN WG1, No. e-Meeting; Nov. 11, 2021-Nov. 19, 2021 Nov. 5, 2021 (Nov. 5, 2021), XP052074840, Retrieved from the Internet: URL:https://ftp.3gpp.org/tsg_ran/WG1_RL1/TSGR1_107-e/Docs/RI-2111390.zip R1-2111390-Rel-17 eURLLC—Enhanced HARQ-ACK v02.docx [retrieved on Nov. 5, 2021].

(Continued)

*Primary Examiner* — Kiet Tang
(74) *Attorney, Agent, or Firm* — Arent Fox, LLP

(57) ABSTRACT

This disclosure provides systems, methods and apparatus, including computer programs encoded on computer storage media for resolving collisions between deferred uplink transmissions based on priority. A user equipment (UE) receives a first semi-persistent scheduling (SPS) configuration including an indication of resources for acknowledgment (ACK) reporting as uplink control information (UCI), the first SPS configuration indicating a first priority level. The UE receives a second signaling indicating a second priority level for a second transmission, the second priority level being higher than the first priority level. The UE defers a first UCI transmission according to the first SPS configuration during one or more downlink slots to a first uplink capable slot. The first UCI transmission in the first uplink capable slot collides with the second transmission. The UE (Continued)

transmits the second transmission in the first uplink capable slot based on the second priority level being higher than the first priority level.

28 Claims, 12 Drawing Sheets

(56) References Cited

OTHER PUBLICATIONS

International Search Report and Written Opinion—PCT/US2022/076569—ISA/EPO—Dec. 19, 2022.

\* cited by examiner

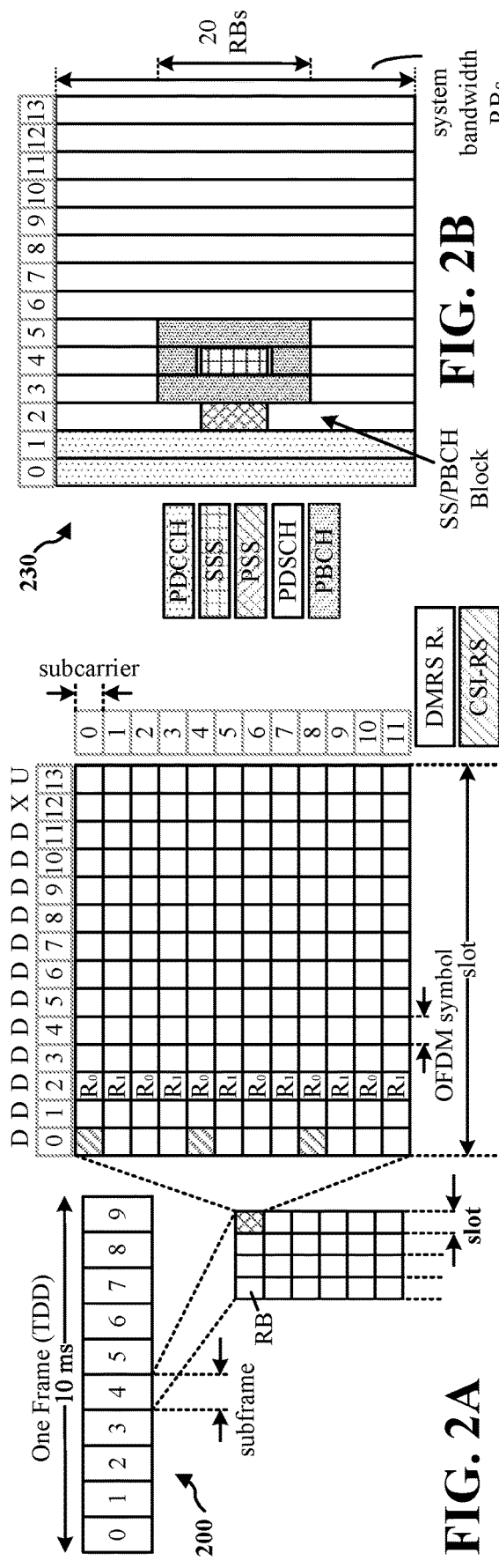
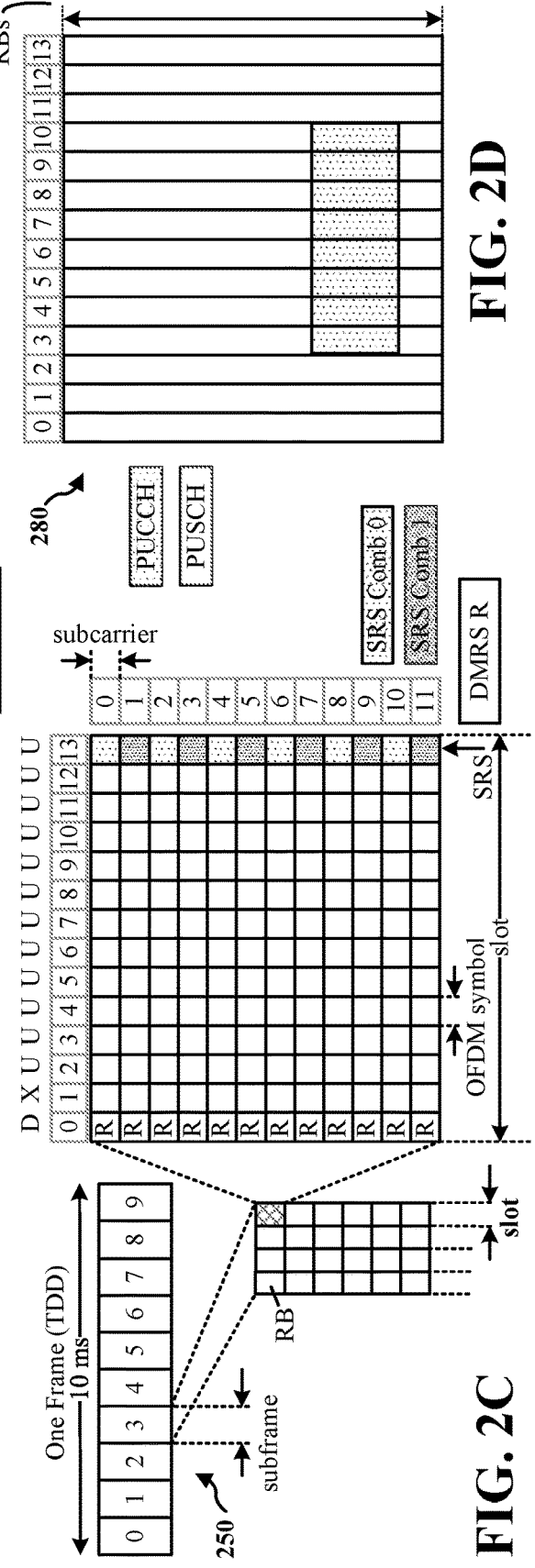

DEFERRAL OF SPS HARQ-ACK WITH DIFFERENT PRIORITIES

CROSS REFERENCE TO RELATED APPLICATIONS

This application claims priority to U.S. Provisional Application No. 63/278,032 titled "DEFERRAL OF SPS HARQ-ACK WITH DIFFERENT PRIORITIES," filed Nov. 10, 2021, which is assigned to the assignee hereof, and incorporated herein by reference in its entirety.

TECHNICAL FIELD

The present disclosure relates to wireless communications including deferral of semi-persistent scheduling (SPS) hybrid automatic repeat request (HARQ) acknowledgment (ACK) with different priorities.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for resolving collisions involving deferred uplink transmissions based on priority at a user equipment (UE). The method may include receiving a first semi-persistent scheduling (SPS) configuration including an indication of resources for acknowledgment (ACK) reporting as uplink control information (UCI), the first SPS configuration indicating a first priority level. The method may include receiving a second signaling indicating a second priority level for a second transmission, the second priority level being higher than the first priority level. The method may include deferring a first UCI transmission according to the first SPS configuration during one or more downlink slots to a first uplink capable slot subsequent to the one or more downlink slots, the first UCI transmission in the first uplink capable slot collides with the second transmission. The method may include transmitting the second transmission in the first uplink capable slot based on the second priority level being higher than the first priority level.

The present disclosure also provides an apparatus (e.g., a UE) including a memory storing computer-executable instructions and at least one processor configured to execute the computer-executable instructions to perform at least one of the above methods, an apparatus including means for performing at least one of the above methods, and a non-transitory computer-readable medium storing computer-executable instructions for performing at least one of the above methods.

One innovative aspect of the subject matter described in this disclosure can be implemented in a method of resolving collisions involving deferred uplink transmissions at a base station based on priority. The method may include transmitting a first semi-persistent scheduling (SPS) configuration including an indication of resources for acknowledgment (ACK) reporting as uplink control information (UCI), the first SPS configuration indicating a first priority level. The method may include transmitting a second signaling indicating a second priority level for a second uplink transmission, the second priority level being higher than the first priority level. The method may include determining that a first UCI transmission according to the first SPS configuration during one or more downlink slots is deferred to a first uplink capable slot subsequent to the one or more downlink slots that collides with the second uplink transmission. The method may include receiving the second uplink transmission in the first uplink capable slot based on the first priority level and the second priority level.

The present disclosure also provides an apparatus (e.g., a BS) including a memory storing computer-executable instructions and at least one processor configured to execute the computer-executable instructions to perform at least one of the above methods, an apparatus including means for performing at least one of the above methods, and a non-transitory computer-readable medium storing computer-executable instructions for performing at least one of the above methods.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 2A is a diagram illustrating an example of a first frame.

FIG. 2B is a diagram illustrating an example of DL channels within a subframe.

FIG. 2C is a diagram illustrating an example of a second frame.

FIG. 2D is a diagram illustrating an example of a subframe.

Like reference numbers and designations in the various drawings indicate like elements.

DETAILED DESCRIPTION

Figure 1:
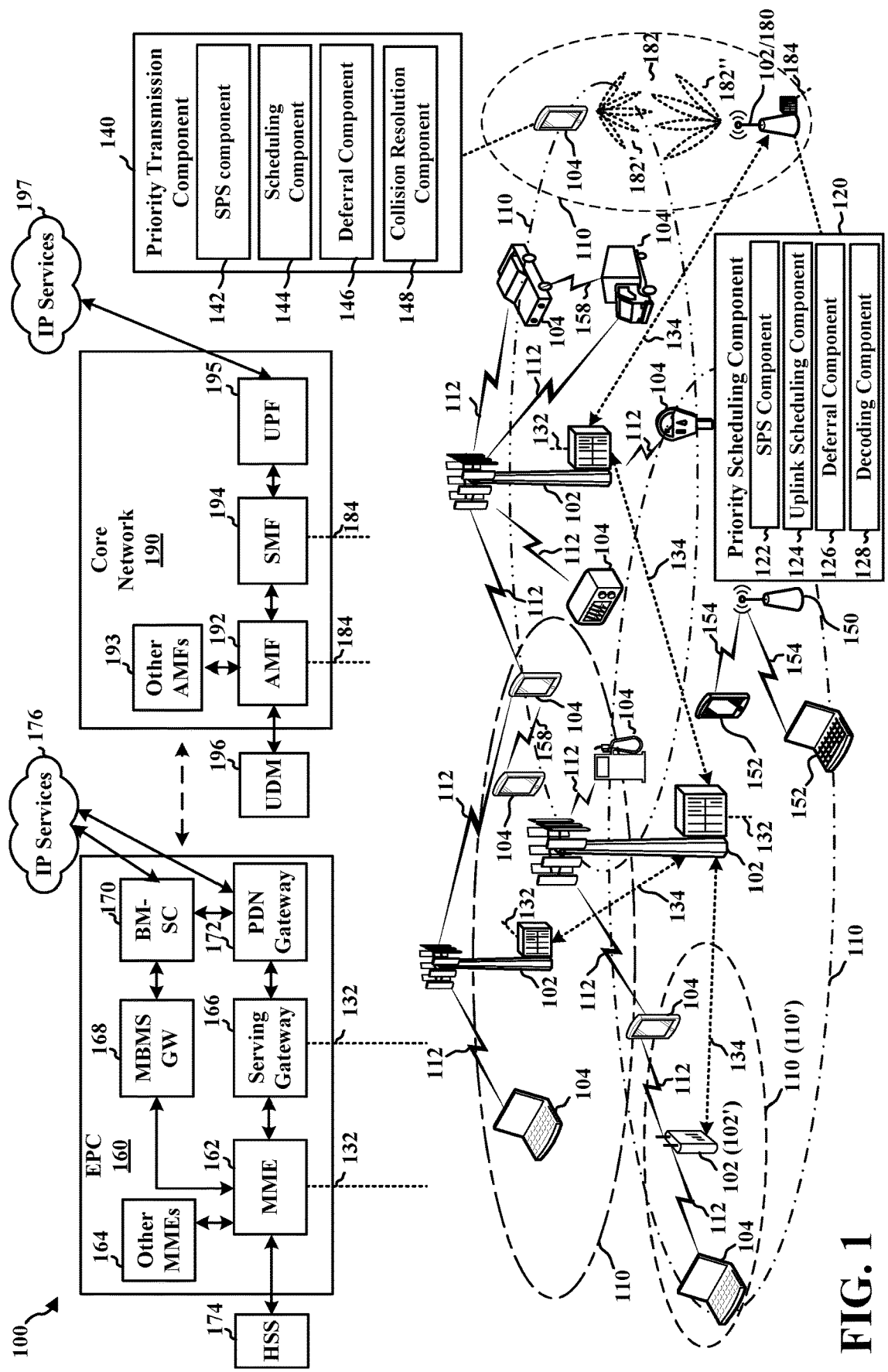
FIG. 1 is a diagram illustrating an example of a wireless communications system and an access network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

A user equipment (UE) may be configured for periodic downlink communications using semi-persistent scheduling (SPS). An SPS configuration may reserve downlink resources within downlink slots with a period and a duration. The SPS configuration may also reserve uplink resources for a physical layer acknowledgement (ACK) referred to as a hybrid automatic repeat request (HARD)-ACK, which may be transmitted as uplink control information (UCI). The SPS configuration may specify a time after the downlink resources when the UE is to transmit the UCI carrying the HARQ-ACK within uplink capable slots such as uplink slots or special slots. In some scenarios, the uplink resources may not be available for the UCI transmission. For example, a slot format may be changed such that an uplink slot is repurposed for downlink. Due to the extended nature of SPS, the SPS configuration may not be updated in time to identify new uplink resource for the UCI carrying the SPS-HARQ ACK. To avoid a need to retransmit the downlink transmission according to the SPS, the UE may defer transmission of the UCI carrying the SPS-HARQ ACK to a next uplink capable slot, which may be a special slot or an uplink slot.

Some uplink transmissions may be prioritized at the physical layer. For example, high priority transmission may relate to signaling or have a higher specified quality of service (QoS). For SPS configurations, the HARQ-ACK may have the same priority as the downlink transmission. The deferral of SPS HARQ-ACKs may result in collisions between uplink transmissions with different priority. For example, a HARQ-ACK for a low priority SPS configuration may be deferred to a next uplink capable slot. Additionally, if a high priority SPS is also deferred to the same uplink capable slot, the UE may have two UCIs carrying HARQ-ACKs to transmit in the same slot. 3GPP NR Release 17 allows multiplexing of UCI, which may allow the UE to transmit both UCI in the same uplink slot. However, UCI multiplexing may not be enabled on all UEs. Accordingly, there is a need for UEs and base stations to handle collisions between uplink transmissions such that the base station can receive at least one of the scheduled uplink transmissions.

In an aspect, the present disclosure provides for a UE to determine whether to transmit a UCI that collides with another uplink transmission based on a priority of each uplink transmission. For example, when the HARQ-ACK for a low priority UCI is deferred to an uplink slot with a high priority transmission, the UE may transmit the high priority transmission. For instance, the UE may transmit the high priority transmission even if the low priority transmission was scheduled for earlier transmission. In some implementations, when the low priority UCI cannot be transmitted in the next uplink capable slot, the UE may drop the low priority UCI. In some implementations, when the low priority UCI cannot be transmitted in the next uplink slot, the UE may further defer the low priority UCI to a subsequent uplink capable slot.

Particular implementations of the subject matter described in this disclosure can be implemented to realize one or more of the following potential advantages. Collisions between multiple uplink transmissions may be resolved such that at least the higher priority transmission occurs. Additionally, where low priority transmissions are further deferred to available uplink resources, the UE may avoid retransmission of a previously received downlink transmission, thereby improving resource utilization.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. The processor may include an interface or be coupled to an interface that can obtain or output signals. The processor may obtain signals via the interface and output signals via the interface. In some implementations, the interface may be a printed circuit board (PCB) transmission line. In some other implementations, the interface may include a wireless transmitter, a wireless transceiver, or a combination thereof. For example, the interface may include a radio frequency (RF) transceiver which can be implemented to receive or transmit signals, or both. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (such as a 5G Core (5GC)). The base stations 102 may include macrocells (high power cellular base station) or small cells (low power cellular base station). The macrocells include base stations. The small cells include femtocells, picocells, and microcells. The small cells include femtocells, picocells, and microcells. The base stations 102 can be configured in a Disaggregated RAN (D-RAN) or Open RAN (O-RAN) architecture, where functionality is split between multiple units such as a central unit (CU), one or more distributed units (DUs), or a radio unit (RU). Such architectures may be configured to utilize a protocol stack that is logically split between one or more units (such as one or more CUs and one or more DUs). In some aspects, the CUs may be implemented within an edge RAN node, and in some aspects, one or more DUs may be co-located with a CU, or may be geographically distributed throughout one or multiple RAN nodes. The DUs may be implemented to communicate with one or more RUs.

In some implementations, one or more of the UEs 104 may include a priority transmission component 140. The priority transmission component 140 may include a SPS component 142 configured to receive a first SPS configuration including an indication of resources for ACK reporting as UCI. The first SPS configuration may indicate a first priority level. The priority transmission component 140 may include a scheduling component 144 configured to receive a second signaling indicating a second priority level for a second transmission. The second priority level may be higher than the first priority level. The priority transmission component 140 may include a deferral component 146 configured to defer a first UCI transmission according to the first SPS configuration during one or more downlink slots to a first uplink capable slot subsequent to the one or more downlink slots. The first UCI transmission in the first uplink capable slot collides with the second transmission. The priority transmission component 140 may include a transmission component configured to transmit the second transmission in the first uplink capable slot based on the second priority level being higher than the first priority level.

In some implementations, one or more of the base stations 102 may include a priority scheduling component 120 configured to schedule transmission for a UE and receive HARQ-ACK based on a priority of the transmissions. The priority scheduling component 120 may include a SPS component 122 configured to transmit a first SPS configuration including an indication of resources for ACK reporting as UCI. The first SPS configuration may indicate a first priority level. The priority scheduling component 120 may include an uplink scheduling component 124 configured to transmit a second signaling indicating a second priority level for a second transmission, the second priority level being higher than the first priority level. The priority scheduling component 120 may include a deferral component 126 configured to determine that a first UCI transmission according to the first SPS configuration during one or more downlink slots is deferred to a first uplink capable slot subsequent to the one or more downlink slots. The first UCI may collide with the second transmission for the second UCI in the first uplink capable slot. The priority scheduling component 120 may include a decoding component 128 configured to receive, the second transmission in the first uplink capable slot based on the first priority level and the second priority level.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (such as S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or core network 190) with each other over third backhaul links 134 (such as X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 112 between the base stations 102 and the UEs 104 may include UL (also referred to as reverse link) transmissions from a UE 104 to a base station 102 or DL (also referred to as forward link) transmissions from a base station 102 to a UE 104. The communication links 112 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as a MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor, etc.). The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies including future 6G technologies.

FIG. 2A is a diagram 200 illustrating an example of a first frame. FIG. 2B is a diagram 230 illustrating an example of DL channels within a subframe. FIG. 2C is a diagram 250 illustrating an example of a second frame. FIG. 2D is a diagram 280 illustrating an example of a subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. A subset of the total cell bandwidth of a cell is referred to as a Bandwidth Part (BWP) and bandwidth adaptation is achieved by configuring the UE with BWP(s) and telling the UE which of the configured BWPs is currently the active one. In an aspect, a narrow bandwidth part (NBWP) refers to a BWP having a bandwidth less than or equal to a maximum configurable bandwidth of a BWP. The bandwidth of the NBWP is less than the carrier system bandwidth. The NBWP may hop over the carrier system bandwidth. The hopping may provide frequency diversity gains without increasing the BWP size or using a narrower active BWP.

In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure or different channels. A frame (10 milliseconds (ms)) may be divided into 10 equally sized subframes (1 ms). Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 microseconds ($\mu$s).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS also may include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
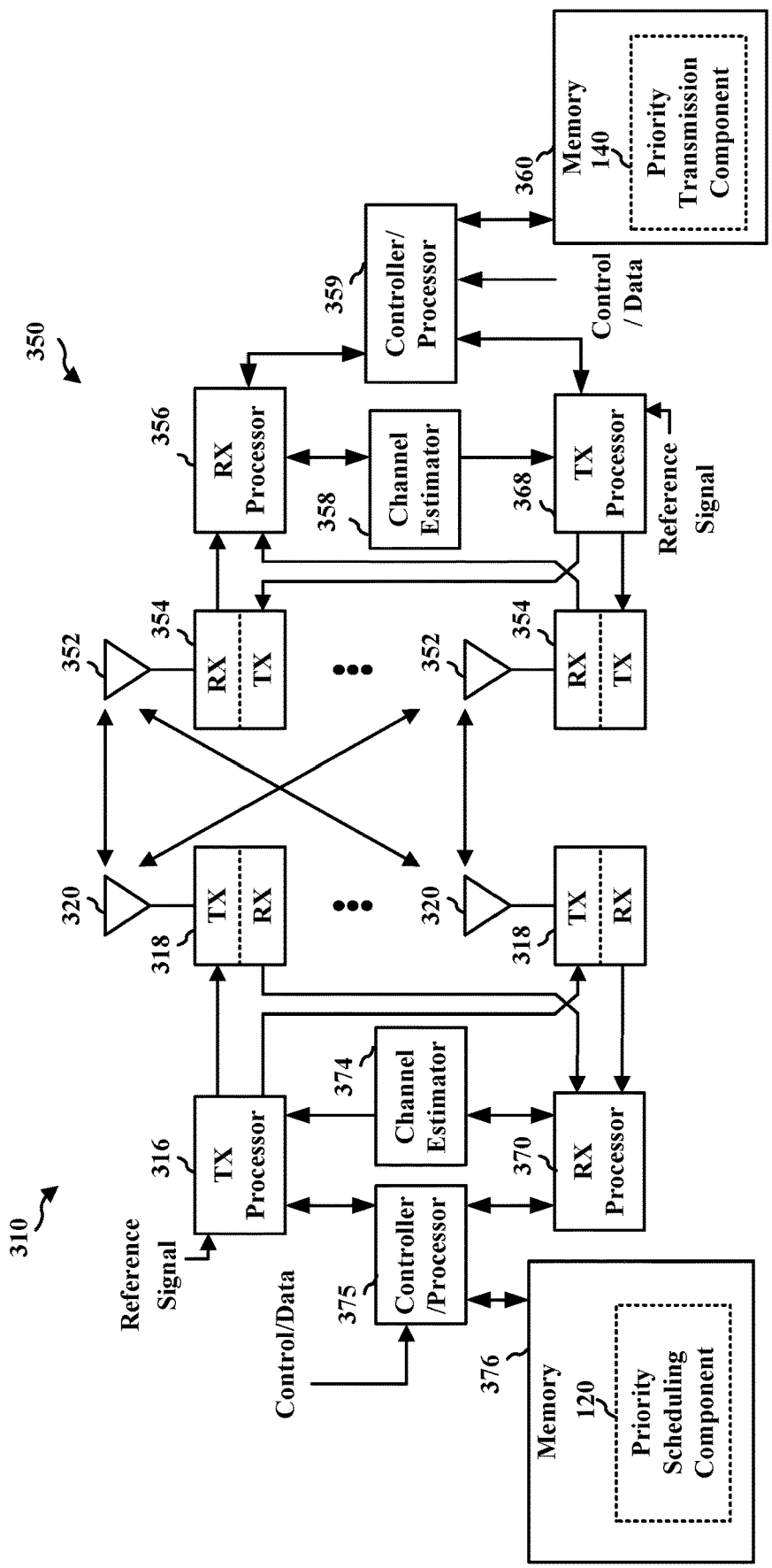
FIG. 3 is a diagram illustrating an example of a base station (BS) and user equipment (UE) in an access network.

FIG. 3 is a diagram of an example of a base station 310 and a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TB s), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may be split into parallel streams. Each stream may be mapped to an OFDM subcarrier, multiplexed with a reference signal (such as a pilot) in the time or frequency domain, and combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are decoded and deinterleaved to recover the data and control signals that were originally transmitted by the base station 310 on the physical channel. The data and control signals are provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (such as MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with the priority transmission component 140 of FIG. 1. For example, the memory 360 may include executable instructions defining the priority transmission component 140. The TX processor 368, the RX processor 356, and/or the controller/processor 359 may be configured to execute the priority transmission component 140.

At least one of the TX processor 316, the RX processor 370, and the controller/processor 375 may be configured to perform aspects in connection with the priority scheduling component 120 of FIG. 1. For example, the memory 376 may include executable instructions defining the priority scheduling component 120. The TX processor 316, the RX processor 370, and/or the controller/processor 375 may be configured to execute the priority scheduling component 120.

Figure 4:
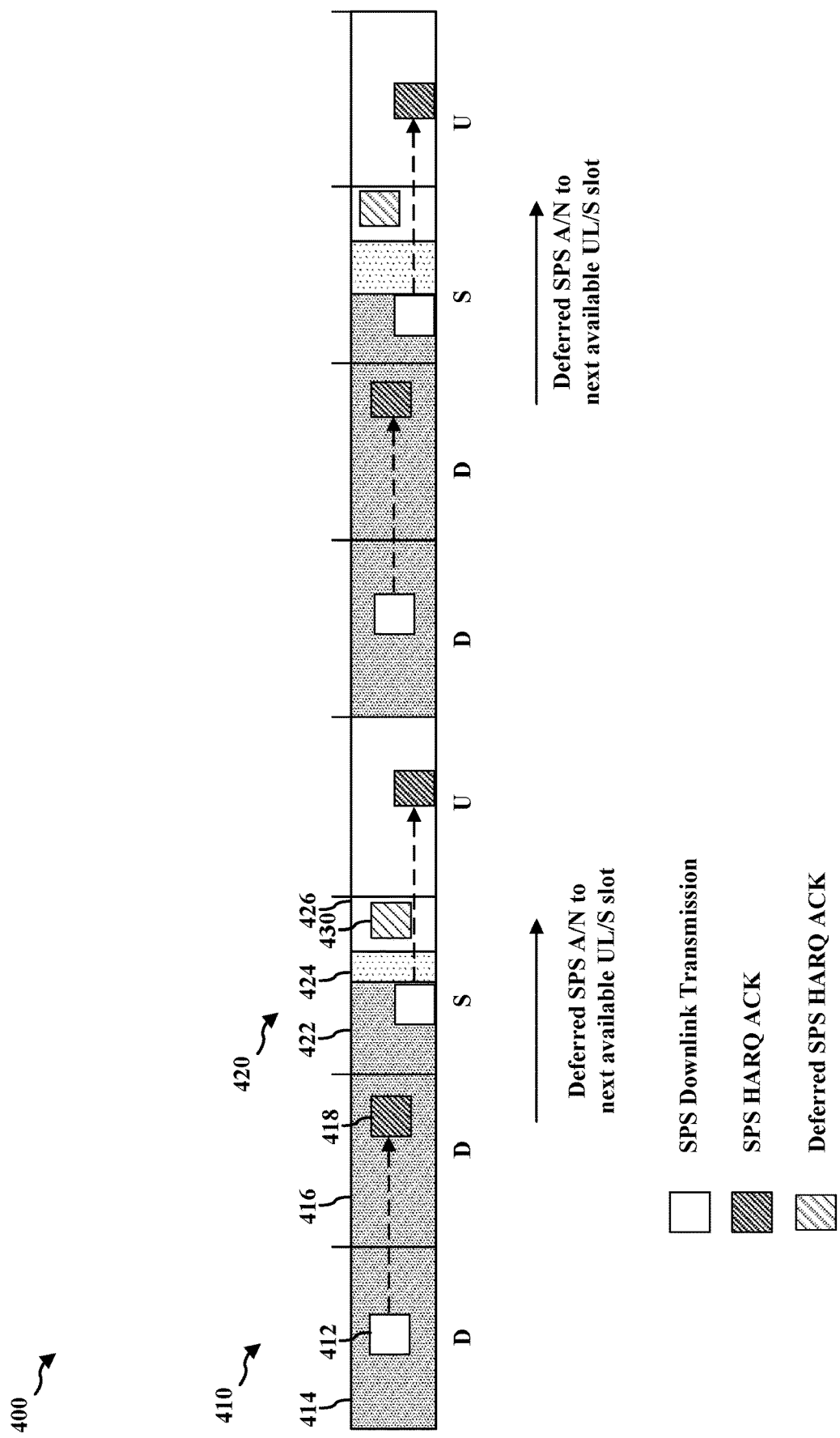
FIG. 4 is a diagram illustrating an example of deferral of a semi-persistent scheduling (SPS) hybrid automatic repeat request (HARQ) acknowledgment (ACK) to an uplink slot.

FIG. 4 is a diagram 400 illustrating an example of deferral of a SPS HARQ ACK 418 to an uplink slot 420. As discussed above regarding FIG. 2A, a frame 410 may be divided into a plurality of slots according to a slot format. The slot format may include downlink (D), uplink (U), and special or flexible (S or X) slots. Uplink capable slots include U slots and S slots, both of which may include uplink transmissions such as the SPS HARQ ACK 418.

SPS scheduling may be used to schedule periodic downlink transmissions 412. An SPS configuration may identify a slot for the downlink transmission 412 (e.g., downlink slot 414). The SPS configuration may further identify an uplink resource for a SPS HARQ ACK 418 by specifying a time (K1) after the downlink transmission 412. Generally, the SPS HARQ ACK 418 is scheduled for an uplink slot or special slot according to the slot format. The slot format, however, may be changed dynamically through DCI, or semi-statically/statically through RRC signaling through a received slot format indicator (SFI). Accordingly, in some scenarios, a slot 416 that is designated as an uplink slot or special slot when the SPS configuration is set may be changed to a downlink slot. The SPS HARQ ACK 418 scheduled in slot 416 may not be transmitted in the downlink slot, but may be deferred until a next uplink slot. For example, the UE may transmit a deferred SPS HARQ ACK 430 in a next uplink slot, which may be an uplink portion 426 of a special slot 420, which also includes a downlink portion 422 and a gap 424. By deferring the SPS HARQ ACK 418 to the uplink slot, the UE may acknowledge the downlink transmission 412 and avoid a retransmission.

Figure 5:
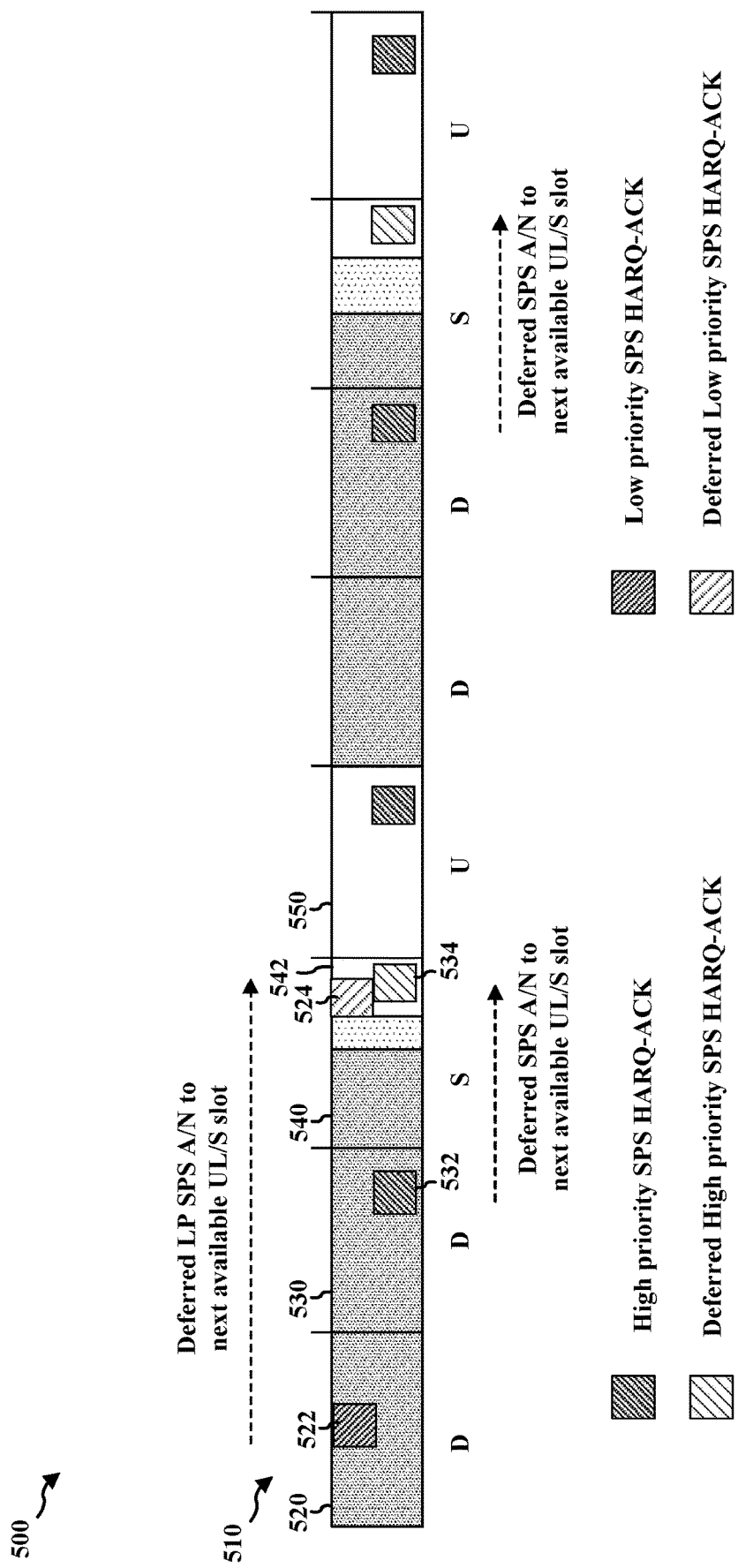
FIG. 5 is a diagram illustrating an example of deferral of two SPS HARQ ACKs having different priorities.

FIG. 5 is a diagram 500 illustrating an example of deferral of two SPS HARQ ACKs having different priorities. The frame 510 may have a similar slot format to the frame 410. A first SPS configuration may be a low priority SPS configuration that schedules a low priority SPS HARQ ACK 520 in a slot 522. The downlink transmission corresponding to the low priority SPS HARQ ACK 522 may occur in a previous slot (not shown for simplicity). A second SPS configuration may be a high priority SPS configuration that schedule a high priority SPS HARQ ACK 532 in a slot 530. The slots 520 and 530 may initially be uplink slots, but may be changed to downlink slots via a SFI. Accordingly, the UE may defer the low priority SPS HARQ ACK 522 and the high priority SPS HARQ ACK 532 until a next available uplink slot, which may be the uplink portion 542 of a special slot 540. The deferred low priority SPS HARQ ACK 524 may collide with the deferred high priority SPS HARQ ACK 534 in the slot 540. As used herein, the term "collide" may refer to two transmissions being scheduled on overlapping resources (e.g., a slot). For example, the deferral of an SPS HARQ ACK may result in a collision because the next available uplink slot is selected dynamically at the UE rather than based on signaling received from the base station.

In some implementations, a deferred low priority SPS HARQ ACK 524 may collide with uplink transmissions other than the deferred high priority SPS HARQ ACK 534. For example, the UE may be scheduled to transmit a different high priority uplink transmission in slot 540. For example, other high priority uplink transmissions may include a RRC configured high priority channel state information (CSI) report, a RRC configured high priority configured grant physical uplink shared channel (PUSCH); a high priority dynamically scheduled PUSCH; or a deferred high priority uplink transmission.

In some cases, a UE may implement UCI multiplexing to transmit both the low priority SPS HARQ ACK 522 and the high priority SPS HARQ ACK 532 in the slot 540 in the event of a collision between the scheduled transmissions. Similarly, the UE may be able to multiplex the low priority SPS HARQ ACK 522 with other high priority transmissions. In some cases, however, the UE may be incapable of such multiplexing or may not be configured to perform such multiplexing. For example, in some scenarios such multiplexing may be undesired. For instance, multiplexing the low priority SPS HARQ ACK 522 with a high priority transmission may involve rate matching or puncturing the high priority transmission, which may reduce the reliability of a high priority transmission. In an aspect, the UE may avoid transmitting colliding scheduled transmissions on the same resource when multiplexing is not supported, enabled, or desired.

Figure 6:
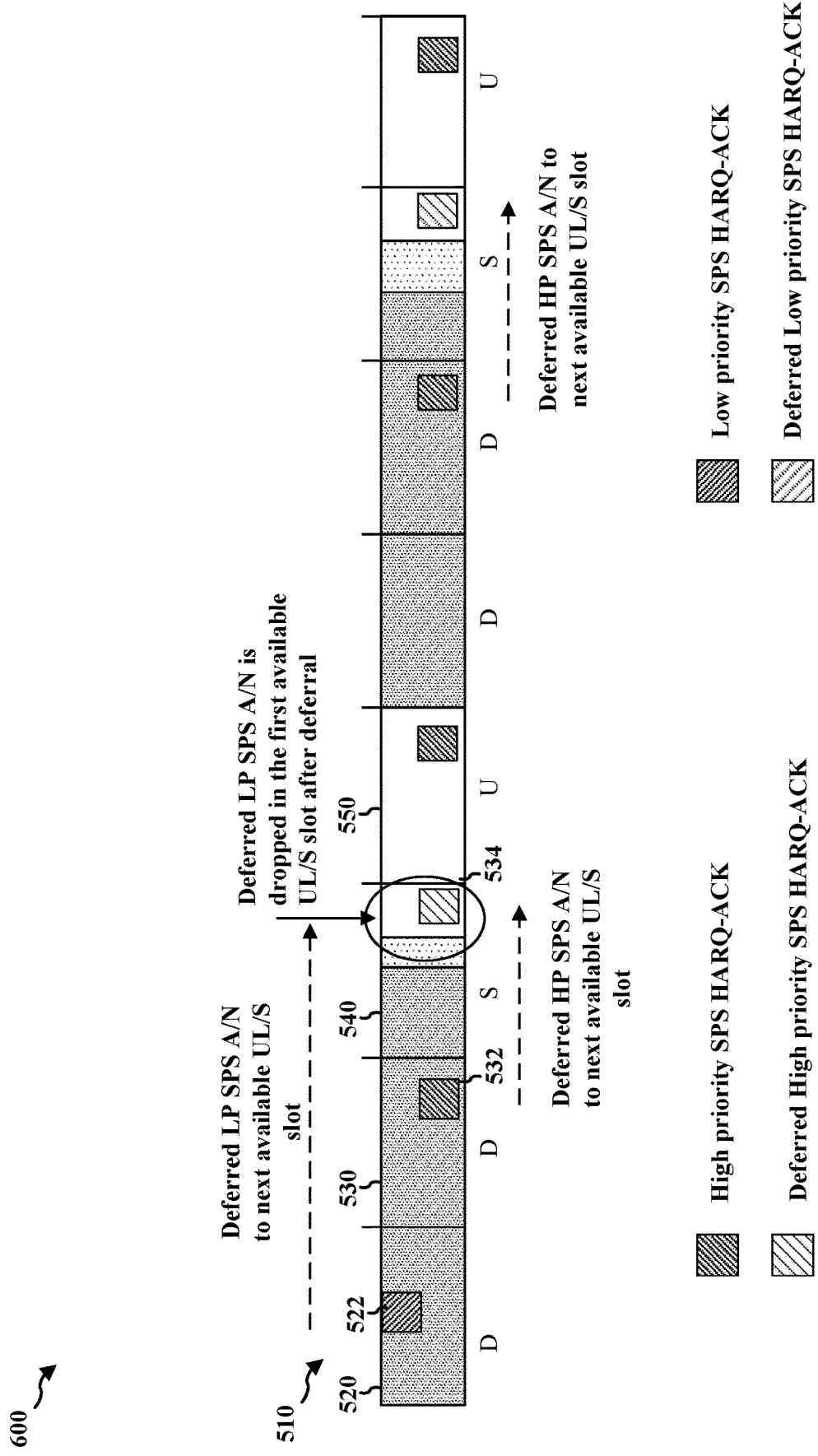
FIG. 6 is a diagram illustrating an example of dropping a deferred low priority SPS HARQ ACK.

FIG. 6 is a diagram 600 illustrating an example of dropping a deferred low priority SPS HARQ ACK. As discussed with respect to FIG. 5, the deferred low priority SPS HARQ ACK 524 may collide with the deferred high priority SPS HARQ ACK 534 in the slot 540. The UE may drop the deferred low priority SPS HARQ ACK 524. That is, the UE may not transmit the deferred low priority SPS HARQ ACK 524. The UE may transmit the deferred high priority SPS HARQ ACK 534 (or other high priority transmission). Accordingly, the base station may receive the high priority transmission. Because the base station does not receive the deferred low priority SPS HARQ ACK 524, the base station may assume that the SPS downlink transmission was not correctly received and retransmit the SPS downlink transmission.

Figure 7:
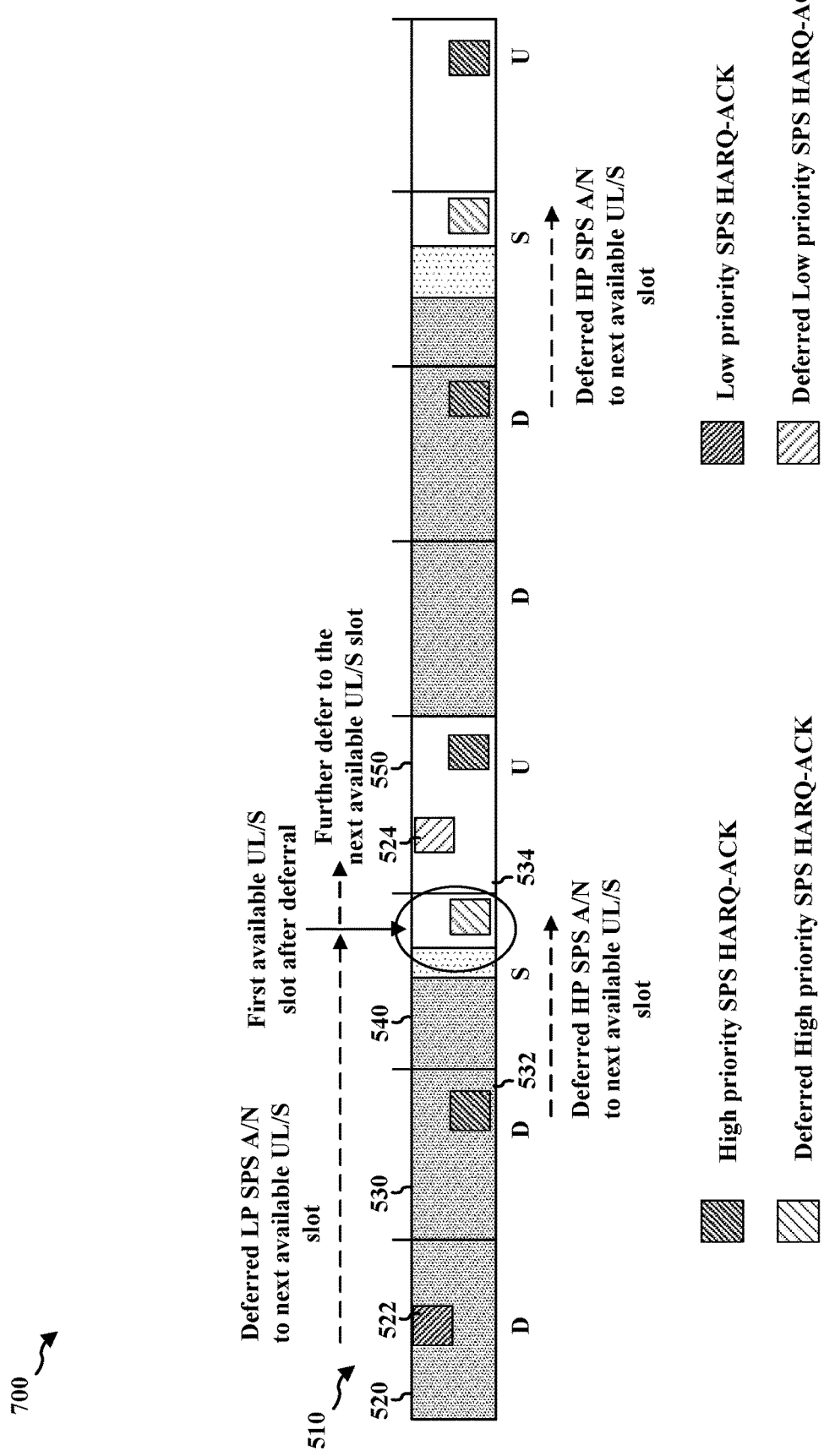
FIG. 7 is a diagram illustrating an example of further deferring a deferred low priority SPS HARQ ACK.

FIG. 7 is a diagram 700 illustrating an example of further deferring a deferred low priority SPS HARQ ACK. As discussed with respect to FIG. 5, the deferred low priority SPS HARQ ACK 524 may collide with the deferred high priority SPS HARQ ACK 534 in the slot 540. The UE may transmit the deferred high priority SPS HARQ ACK 534 in the slot 540. The UE may further defer the deferred low priority SPS HARQ ACK 524 to the next uplink slot 550. Accordingly, the deferred low priority SPS HARQ ACK 524 may eventually be transmitted instead of dropped. Transmitting the deferred low priority SPS HARQ ACK 524 in a later slot may avoid a retransmission of the low priority downlink SPS transmission.

Figure 8:
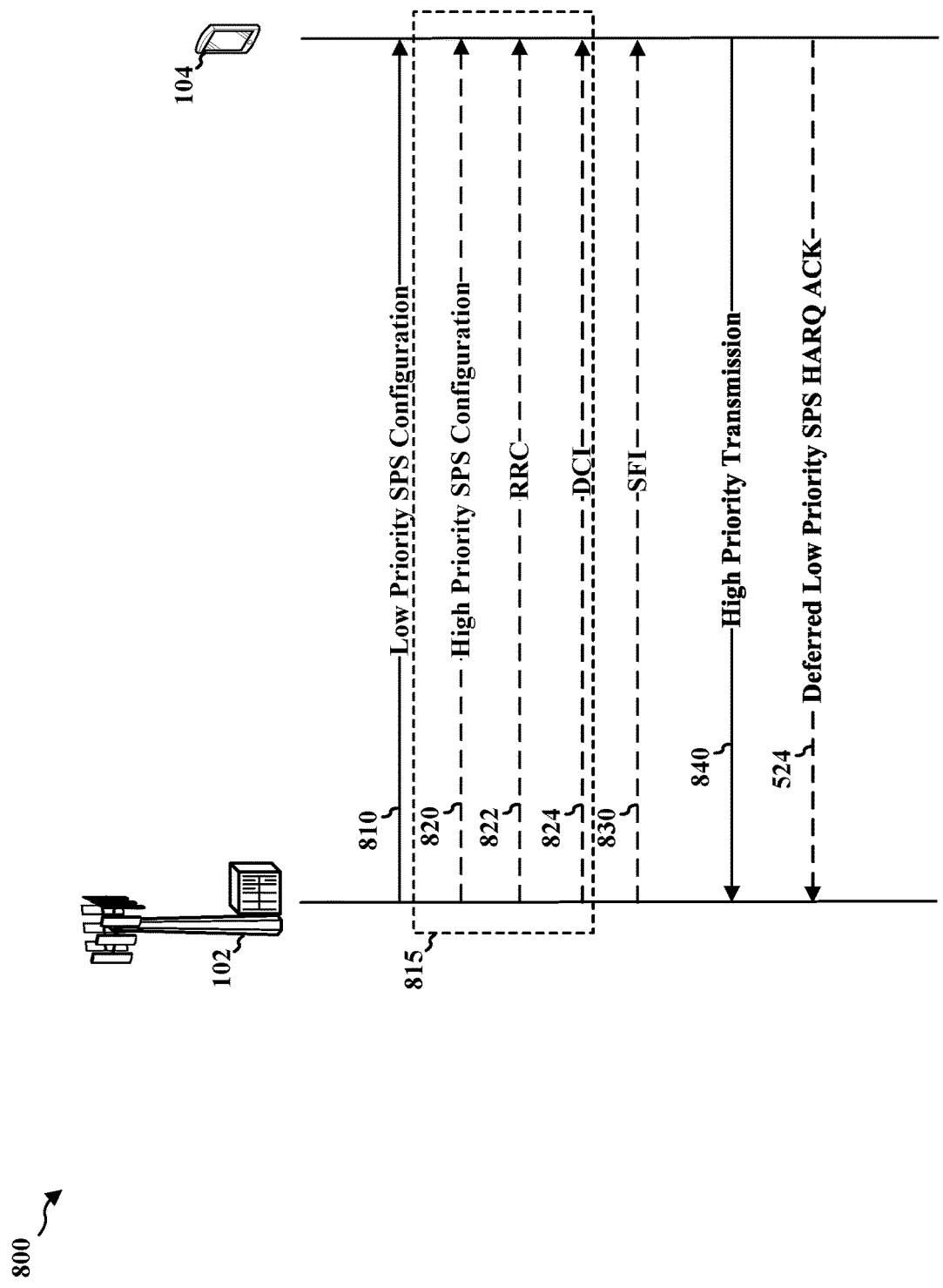
FIG. 8 is a message diagram illustrating example messages for transmitting deferred SPS HARQ ACK based on priority.

FIG. 8 is a message diagram 800 illustrating example messages for transmitting deferred SPS HARQ ACK based on priority. A base station 102 may transmit a low priority SPS configuration 810. For example, the SPS configuration 810 may configure the SPS downlink transmission 412 and the SPS HARQ ACK 418 or low priority SPS HARQ ACK 522. The base station 102 may transmit a second signaling 815, which may be one of a high priority SPS configuration 820, a RRC message 822, or a DCI 824. The second signaling 815 may indicate time and frequency domain resources (e.g., scheduling) for a second transmission. For example, the high priority SPS configuration 820 may schedule a high priority downlink transmission (not shown) and the high priority SPS HARQ ACK 532. As another example, the RRC message 822 may schedule a high priority channel state information (CSI) report or a high priority configured grant PUSCH. As yet another example, the DCI 824 may schedule a high priority dynamic PUSCH. The second signaling 815 may be referred to as second scheduling. In some implementations, the base station 102 may transmit a SFI 830 that changes the slot format of the frame 510 where the low priority SPS HARQ ACK 522 is scheduled. Accordingly, the SPS HARQ ACK 522 may be deferred to a next uplink slot (e.g., slot 540) and collide with the high priority transmission 840. In an aspect, the UE 104 may transmit the high priority transmission 840 in the next uplink slot instead of the deferred low priority SPS HARQ ACK 524. In some implementations, the UE 104 may further defer the low priority SPS HARQ ACK 524 to a subsequent uplink slot and transmit the low priority SPS HARQ ACK 524 in the subsequent uplink slot.

Figure 9:
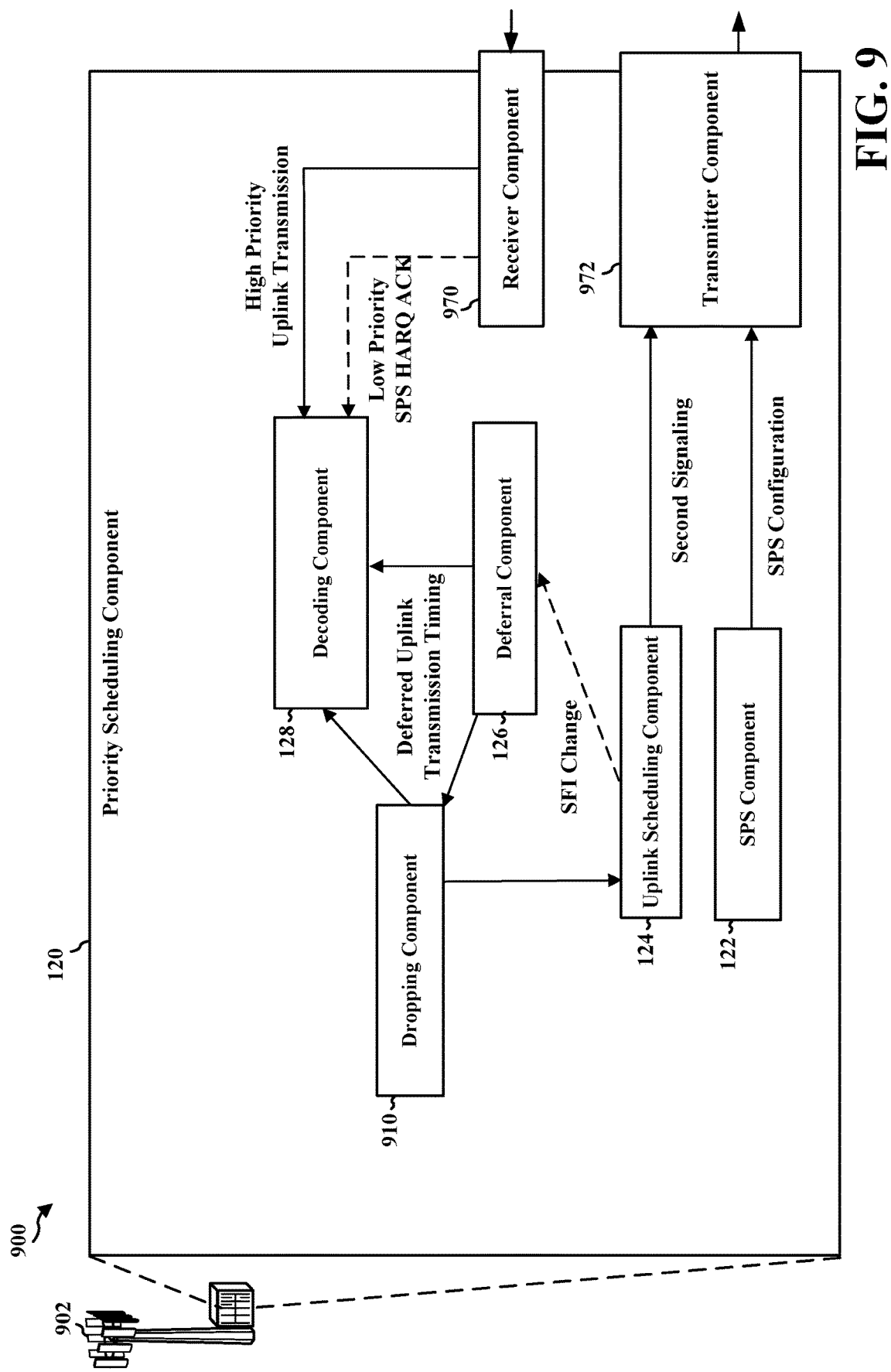
FIG. 9 is a conceptual data flow diagram illustrating the data flow between different means/components in an example BS.

FIG. 9 is a conceptual data flow diagram 900 illustrating the data flow between different means/components in an example base station 902, which may be an example of the base station 102 including the priority scheduling component 120. The priority scheduling component 120 may be implemented by the memory 376 and the TX processor 316, the RX processor 370, and/or the controller/processor 375 of FIG. 3. For example, the memory 376 may store executable instructions defining the priority scheduling component 120 and the TX processor 316, the RX processor 370, and/or the controller/processor 375 may execute the instructions.

The base station 102 may include a receiver component 970, which may include, for example, a radio frequency (RF) receiver for receiving the signals described herein. The base station 102 may include a transmitter component 972, which may include, for example, an RF transmitter for transmitting the signals described herein. In an aspect, the receiver component 970 and the transmitter component 972 may be co-located in a transceiver such as illustrated by the TX/RX 318 in FIG. 3.

As discussed with respect to FIG. 1, the priority scheduling component 120 may include the SPS component 122, the uplink scheduling component 124, the deferral component 126, and the decoding component 128. The priority scheduling component 120 may optionally include a dropping component 910.

The SPS component 122 may transmit a first SPS configuration including an indication of resources for ACK reporting as UCI. For example, the SPS component 122 may generate the first SPS configuration based on higher layer scheduling of a traffic flow. For instance, an application may request periodic updates from an application server, and the higher layer scheduling may generate a traffic flow to carry the updates. The first SPS configuration may specify resources for a periodic downlink transmission and uplink resources for a HARQ ACK. The first SPS configuration may indicate a first priority level. For example, the first priority level may be a low priority level or an indication of no physical layer priority. The SPS component 122 may transmit the SPS configuration via the transmitter component 972, for example, as an RRC message.

The uplink scheduling component 124 may transmit a second signaling indicating a second priority level for a second uplink transmission. For example, the uplink scheduling component 124 may schedule the second uplink transmission based on higher layer scheduling. For instance, the uplink scheduling component 124 may schedule a dynamic PUSCH in response to a scheduling request from the UE 104. In some implementations, the second signaling may be for URLLC traffic. In some implementations, the second signaling may dynamically change a slot format for the UE 104 (e.g., by including a SFI 830). The uplink scheduling component 124 may transmit the second signaling via the transmitter component 972 (e.g., as a RRC message 822 or DCI 824). In some implementations, the second signaling may be a second SPS configuration. The uplink scheduling component 124 may generate and transmit a second SPS configuration via the SPS component 122.

The deferral component 126 may determine that a first UCI transmission according to the first SPS configuration during one or more downlink slots is deferred to a first uplink slot subsequent to the one or more downlink slots that collides with the second uplink transmission. The deferral component 126 may receive an indication of a SFI change from the uplink scheduling component 124. The deferral component 126 may determine whether any active SPS configurations are affected by the SFI change. In particular, the deferral component 126 may determine whether the SFI change changes any uplink slots on which a HARQ ACK is scheduled to a downlink slot. If so, the deferral component 126 may identify the next uplink slot under the new SFI. The deferral component 126 may determine whether a collision between uplink transmissions will occur in the identified next uplink slot. The deferral component 126 may provide an indication of a collision to the decoding component 128.

The receiver component 970 may receive UL signals from the UE 104 including a high priority uplink transmission. In some implementations, the receiver component 970 may optionally receive a deferred low priority SPS HARQ ACK. The receiver component 970 may provide the high priority uplink transmission and/or the deferred low priority SPS HARQ ACK to the decoding component 128.

The decoding component 128 may receive, the second uplink transmission in the first uplink slot based on the first priority level and the second priority level. The decoding component 128 may receive the indication of a collision and/or deferred uplink transmission timing from the deferral component 126. The decoding component 128 may determine that the second uplink transmission (i.e., the higher priority transmission) is to be received in the identified uplink slot. The decoding component 128 may decode the transmission received in the identified uplink slot as the second uplink transmission. In some implementations, the decoding component 128 may decode the deferred low priority SPS HARQ ACK in a subsequent uplink slot.

In some implementations, the priority scheduling component 120 may include a dropping component 910 that is configured to determine that the first UCI transmission has been dropped. The dropping component 910 may receive the deferred uplink transmission timing from the deferral component 126. The dropping component 910 may determine whether the UE with the deferred uplink transmission is configured to drop lower priority deferred transmissions in the event of a collision. If the deferred uplink transmission timing indicates a collision between a low priority SPS HARQ ACK and a higher priority transmission and the UE is configured to drop such transmissions, the dropping component 910 may indicate to the decoding component 128 that the low priority SPS HARQ ACK has been dropped. Additionally, the dropping component 910 may indicate to the uplink scheduling component that the low priority SPS HARQ ACK has been dropped and the SPS transmission may be scheduled for retransmission.

Figure 10:
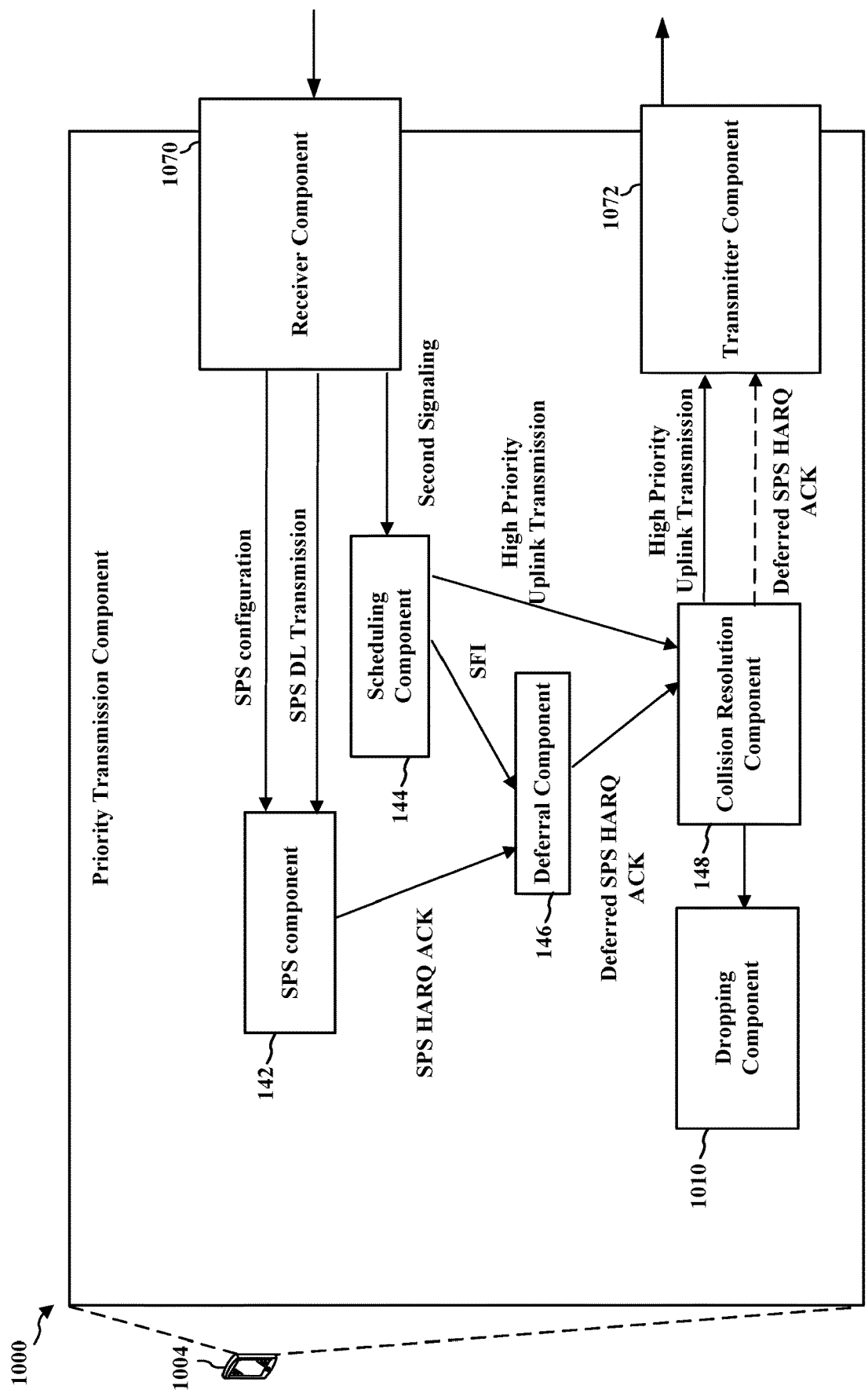
FIG. 10 is a conceptual data flow diagram illustrating the data flow between different means/components in an example UE.

FIG. 10 is a conceptual data flow diagram 1000 illustrating the data flow between different means/components in an example UE 1004, which may be an example of the UE 104 and include the priority transmission component 140. The priority transmission component 140 may be implemented by the memory 360 and the TX processor 368, the RX processor 356, and/or the controller/processor 359. For example, the memory 360 may store executable instructions defining the priority transmission component 140 and the TX processor 368, the RX processor 356, and/or the controller/processor 359 may execute the instructions.

The UE 104 may include a receiver component 1070, which may include, for example, a RF receiver for receiving the signals described herein. The UE 104 may include a transmitter component 1072, which may include, for example, an RF transmitter for transmitting the signals described herein. In an aspect, the receiver component 1070 and the transmitter component 1072 may co-located in a transceiver such as the TX/RX 352 in FIG. 3.

As discussed with respect to FIG. 1, the priority transmission component 140 may include the SPS component 142, the scheduling component 144, the deferral component 146, and the collision resolution component 148. In some implementations, the priority transmission component 140 may optionally include a dropping component 1010.

The receiver component 970 may receive DL signals described herein such as the low priority SPS configuration 810, the high priority SPS configuration 820, the RRC message 822, the DCI 824, the SFI 830 or the SPS DL transmission 412. The receiver component 970 may provide the low priority SPS configuration 810, the high priority SPS configuration 820, or the SPS DL transmission 412 to the SPS component 142. The receiver component 1070 may provide the RRC message 822 or the DCI 824, of the SFI 830 to the scheduling component 144.

The SPS component 142 may receive the low priority SPS configuration 810 via the receiver component 1070. The SPS component 142 may configure the receiver component 1070 to receive the periodic SPS DL transmissions 412 according to the low priority SPS configuration. The SPS component 142 may decode the SPS DL transmissions 412 and determine an SPS HARQ ACK. The SPS component 142 may provide the SPS HARQ ACK to the deferral component 146.

The scheduling component 144 may receive second signaling via the receiver component 1070. For example, the scheduling component 144 may receive the RRC message 822, the DCI 824, the SFI 830, or the high priority SPS configuration 820. The scheduling component 144 may schedule uplink transmission based on the second signaling. The scheduling component 144 may provide the scheduling of high priority uplink transmissions to the collision resolution component 148. If the scheduling component 144 receives an SFI, the scheduling component 144 may forward the SFI to the deferral component 146.

The deferral component 146 may determine whether any scheduled uplink transmissions are to be deferred. For example, the deferral component 146 may determine that scheduled uplink transmissions are to be deferred in response to an SFI 830 that changes a scheduled uplink slot to a downlink slot. The deferral component 146 may provide any deferred transmissions such as a deferred SPS HARQ ACK to the collision resolution component 148. The deferred transmissions may collide with other uplink transmissions in the uplink capable slot.

The collision resolution component 148 may be configured to determine which transmissions to transmit if there is a collision in an uplink capable slot. The collision resolution component 148 may select higher priority transmissions for transmission. For example, if a deferred low priority SPS HARQ ACK collides with a higher priority second transmission, the collision resolution component 148 may transmit the second transmission in the first uplink capable slot via the transmitter component 1072 based on the second priority level being higher than the first priority level. In some implementations, where the UE 1004 is configured to further defer low priority transmissions, the UE 1004 may defer the low priority SPS HARQ ACK to a subsequent uplink slot. In implementations where the UE 1004 is configured to drop low priority transmissions, the collision resolution component 148 may provide the low priority SPS HARQ ACK to the dropping component 1010.

The dropping component 1010 may be configured to drop a low priority transmission. For example, if the low priority transmission is a SPS HARQ ACK, the dropping component 1010 may update an internal record to show that the DL SPS transmission 412 was not acknowledged, and may be scheduled for a retransmission. The dropping component 1010 may retain the data for the DL SPS transmission 412 in a HARQ buffer.

Figure 11:
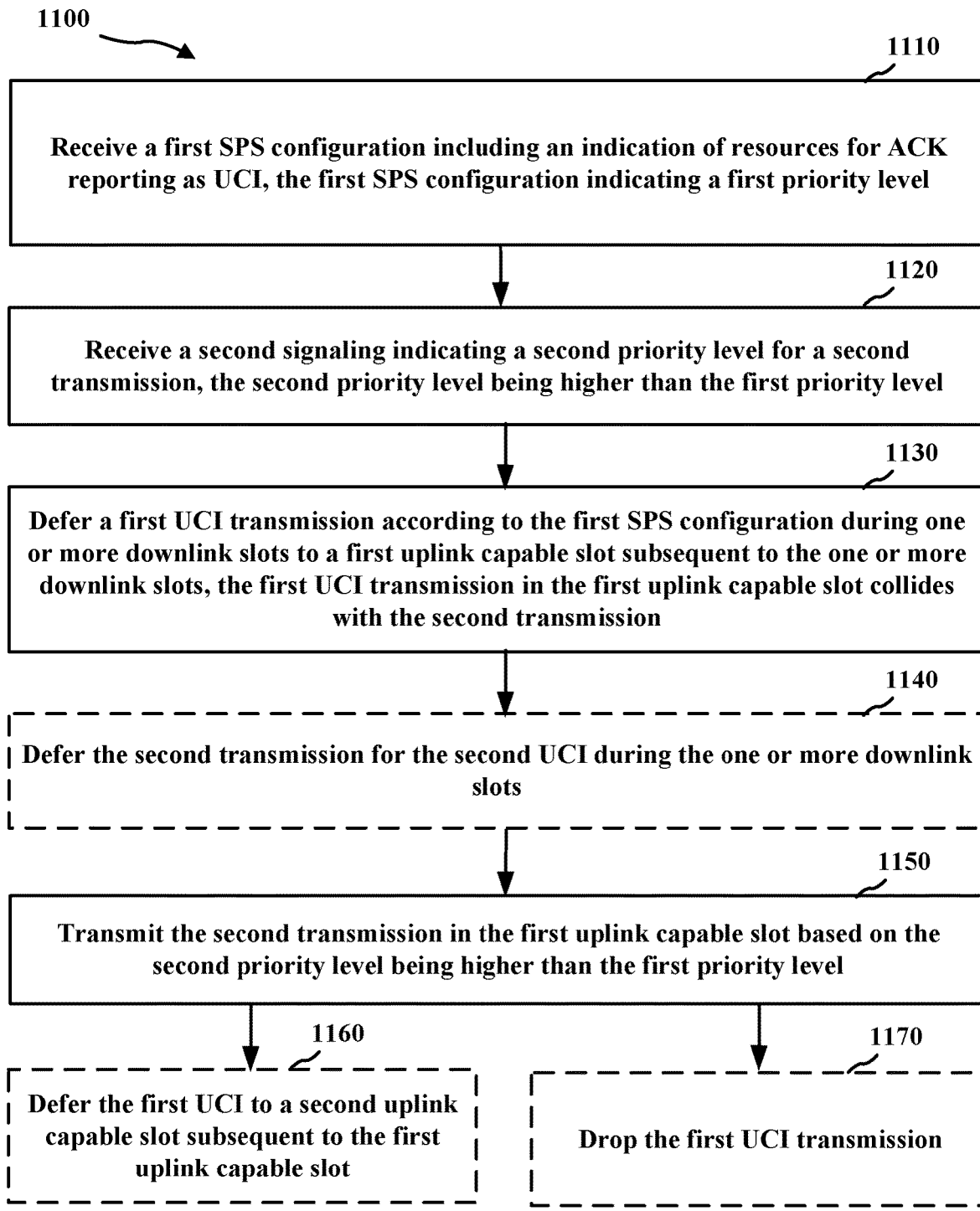
FIG. 11 is a flowchart of an example of a method for a UE to defer transmission of SPS HARQ ACK based on priority.

FIG. 11 is a flowchart of an example method 1100 for a UE to resolve collisions involving deferred transmissions based on priority. The method 1100 may be performed by a UE (such as the UE 104, which may include the memory 360 and which may be the entire UE 104 or a component of the UE 104 such as the priority transmission component 140, TX processor 368, the RX processor 356, or the controller/processor 359). The method 1100 may be performed by the priority transmission component 140 in communication with the priority scheduling component 120 of the base station 102. Optional blocks are shown with dashed lines.

At block 1110, the method 1100 may include receiving a first SPS configuration including an indication of resources for ACK reporting as UCI, the first SPS configuration indicating a first priority level. In some implementations, for example, the UE 104, the RX processor 356 or the controller/processor 359 may execute the priority transmission component 140 or the SPS component 142 to receive the first SPS configuration including an indication of resources for ACK reporting as UCI, the first SPS configuration indicating a first priority level. Accordingly, the UE 104, the RX processor 356, or the controller/processor 359 executing the priority transmission component 140 or the SPS component 142 may provide means for receiving a first SPS configuration including an indication of resources for ACK reporting as UCI.

At block 1120, the method 1100 may include receiving a second signaling indicating a second priority level for a second transmission, the second priority level being higher than the first priority level. In some implementations, for example, the UE 104, the RX processor 356 or the controller/processor 359 may execute the priority transmission component 140 or the scheduling component 144 to switch to receive a second signaling indicating a second priority level for a second transmission, the second priority level being higher than the first priority level. In some implementations, the second signaling for the second transmission is a second SPS configuration including an indication of resources for ACK reporting as a second UCI. In some implementations, the second transmission is a high priority physical layer transmission. In some implementations, the second transmission is dynamically scheduled or scheduled by a radio resource control (RRC) message. For example, the second transmission may be one of a RRC configured high priority channel state information (CSI) report, a RRC configured high priority configured grant physical uplink shared channel (PUSCH); a high priority dynamically scheduled PUSCH; or a deferred high priority uplink transmission. Accordingly, the UE 104, the RX processor 356, or the controller/processor 359 executing the priority transmission component 140 or the scheduling component 144 may provide means for receiving a second signaling indicating a second priority level for a second transmission, the second priority level being higher than the first priority level.

At block 1130, the method 1100 may include deferring a first UCI transmission according to the first SPS configuration during one or more downlink slots to a first uplink capable slot subsequent to the one or more downlink slots, the first UCI transmission in the first uplink capable slot collides with the second transmission. In some implementations, for example, the UE 104, the TX processor 368, or the controller/processor 359 may execute the priority transmission component 140 or the deferral component 146 to defer a first UCI transmission according to the first SPS configuration during one or more downlink slots to a first uplink capable slot subsequent to the one or more downlink slots, the first UCI transmission in the first uplink capable slot collides with the second transmission. Accordingly, the UE 104, the TX processor 368, or the controller/processor 359 executing the priority transmission component 140 or the deferral component 146 may provide means for deferring a first UCI transmission according to the first SPS configuration during one or more downlink slots to a first uplink capable slot subsequent to the one or more downlink slots.

At block 1140, the method 1100 may optionally include deferring a second transmission for the second UCI during the one or more downlink slots. In some implementations, for example, the UE 104, the RX processor 356, or the controller/processor 359 may execute the priority transmission component 140 or the deferral component 146 to defer the second transmission for the second UCI during the one or more downlink slots. Accordingly, the UE 104, the RX processor 356, or the controller/processor 359 executing the priority transmission component 140 or the deferral component 146 may also provide means for deferring the second transmission for the second UCI during the one or more downlink slots.

At block 1150, the method 1100 may include transmitting the second transmission in the first uplink capable slot based on the second priority level being higher than the first priority level. In some implementations, for example, the UE 104, the TX processor 368, or the controller/processor 359 may execute the priority transmission component 140 or the collision resolution component 148 to transmit the second transmission in the first uplink capable slot based on the second priority level being higher than the first priority level. Accordingly, the UE 104, the TX processor 368, or the controller/processor 359 executing the priority transmission component 140 or the collision resolution component 148 may provide means for transmitting the second transmission in the first uplink capable slot based on the second priority level being higher than the first priority level.

At block 1160, the method 1100 may optionally include deferring the first UCI to a second uplink capable slot subsequent to the first uplink capable slot. In some implementations, for example, the UE 104, the TX processor 368, or the controller/processor 359 may execute the priority transmission component 140 or the collision resolution component 148 to defer the first UCI to a second uplink capable slot subsequent to the first uplink capable slot. Accordingly, the UE 104, the TX processor 368, or the controller/processor 359 executing the priority transmission component 140 or the collision resolution component 148 may provide means for deferring the first UCI to a second uplink capable slot subsequent to the first uplink capable slot.

At block 1170, the method 1100 may include dropping the first UCI transmission. In some implementations, for example, the UE 104, the TX processor 368, or the controller/processor 359 may execute the priority transmission component 140 or the dropping component 1010 to drop the first UCI transmission. Accordingly, the UE 104, the TX processor 368, or the controller/processor 359 executing the priority transmission component 140 or the dropping component 1010 may provide means for dropping the first UCI transmission.

Figure 12:
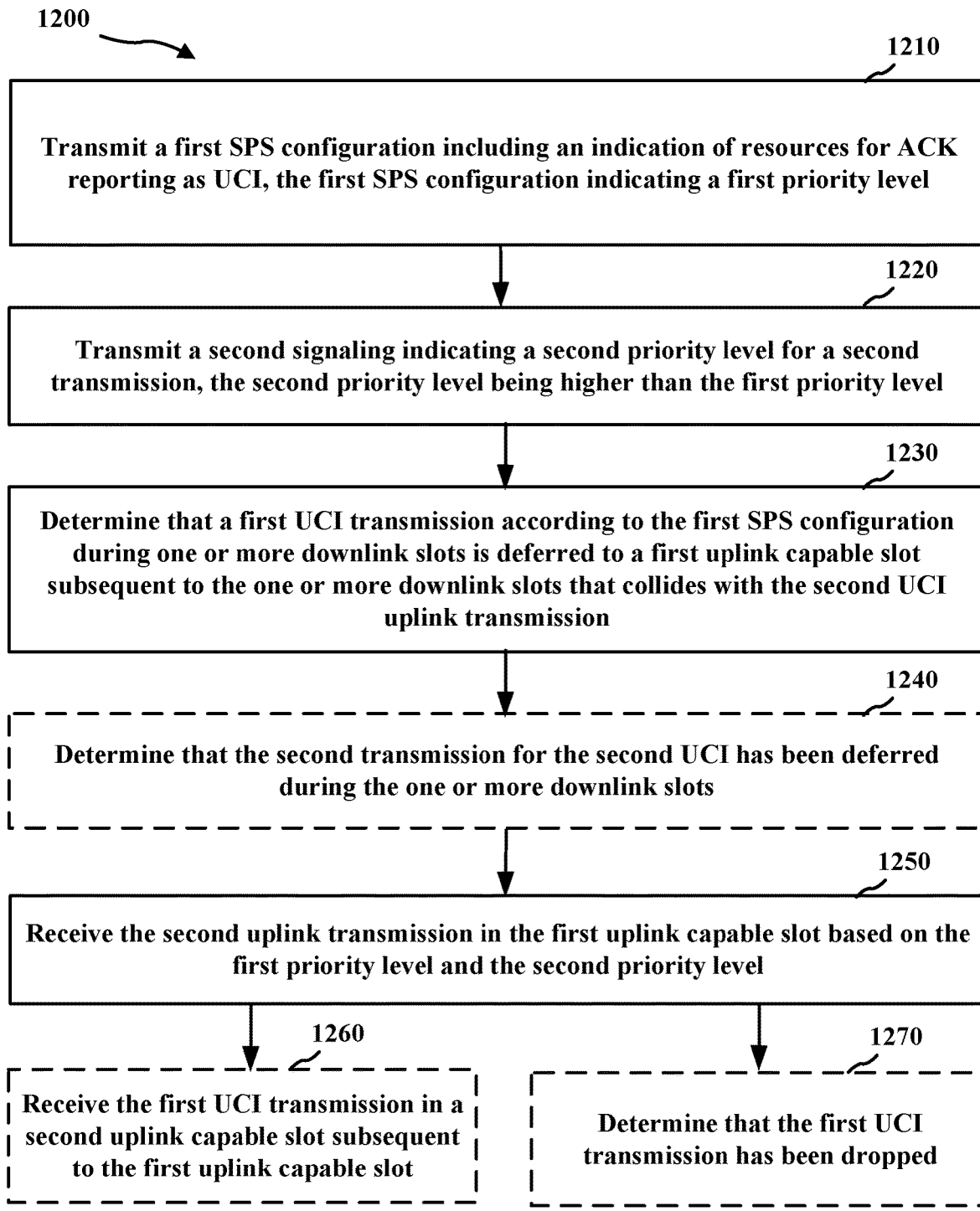
FIG. 12 is a flowchart of an example method for a BS to receive deferred SPS HARQ ACK based on priority.

FIG. 12 is a flowchart of an example method 1200 for a base station to receive deferred uplink transmissions from a UE based on priority. The method 1200 may be performed by a base station (such as the base station 102, which may include the memory 376 and which may be the entire base station 102 or a component of the base station 102 such as the priority scheduling component 120, the TX processor 316, the RX processor 370, or the controller/processor 375). The method 1200 may be performed by the priority scheduling component 120 in communication with the priority transmission component 140 of the UE 104.

At block 1210, the method 1200 may include transmitting a first SPS configuration including an indication of resources for ACK reporting as UCI, the first SPS configuration indicating a first priority level. In some implementations, for example, the base station 102, the TX processor 316, or the controller/processor 375 may execute the priority scheduling component 120 or the SPS component 122 to transmit a first SPS configuration including an indication of resources for ACK reporting as UCI, the first SPS configuration indicating a first priority level. Accordingly, the base station 102, the TX processor 316, or the controller/processor 375 executing the priority scheduling component 120 or the SPS component 122 may provide means for transmitting a first SPS configuration including an indication of resources for ACK reporting as UCI, the first SPS configuration indicating a first priority level.

At block 1220, the method 1200 may include transmitting a second signaling indicating a second priority level for a second transmission, the second priority level being higher than the first priority level. In some implementations, for example, base station 102, the TX processor 316, or the controller/processor 375 may execute the priority scheduling component 120 or the uplink scheduling component 124 to transmit a second signaling indicating a second priority level for a second transmission, the second priority level being higher than the first priority level. Accordingly, the base station 102, the TX processor 316, or the controller/processor 375 executing the priority scheduling component 120 or the uplink scheduling component 124 may provide means for transmitting a second signaling indicating a second priority level for a second transmission.

At block 1230, the method 1200 may include determining that a first UCI transmission according to the first SPS configuration during one or more downlink slots is deferred to a first uplink capable slot subsequent to the one or more downlink slots that collides with the second UCI uplink transmission. In some implementations, for example, the base station 102, the RX processor 370, or the controller/processor 375 may execute the priority scheduling component 120 or the deferral component 126 to determine that a first UCI transmission according to the first SPS configuration during one or more downlink slots is deferred to a first uplink capable slot subsequent to the one or more downlink slots that collides with the second UCI uplink transmission. Accordingly, the base station 102, the RX processor 370, or the controller/processor 375 executing the priority scheduling component 120 or the deferral component 126 may provide means for determining that a first UCI transmission according to the first SPS configuration during one or more downlink slots is deferred to a first uplink capable slot subsequent to the one or more downlink slots that collides with the second UCI uplink transmission.

At block 1240, the method 1200 may optionally include determining that the second uplink transmission for the second UCI has been deferred during the one or more downlink slots. In some implementations, for example, base station 102, the TX processor 316, or the controller/processor 375 may execute the priority scheduling component 120 or the deferral component 126 to determine that the second uplink transmission for the second UCI has been deferred during the one or more downlink slots. Accordingly, the base station 102, the TX processor 316, or the controller/processor 375 executing the priority scheduling component 120 or the deferral component 126 may also provide means for determining that the second uplink transmission for the second UCI has been deferred during the one or more downlink slots.

At block 1250, the method 1200 may include receiving the second uplink transmission in the first uplink capable slot based on the first priority level and the second priority level. In some implementations, for example, base station 102, the TX processor 316, or the controller/processor 375 may execute the priority scheduling component 120 or the decoding component 128 to receive the second uplink transmission in the first uplink capable slot based on the first priority level and the second priority level. Accordingly, the base station 102, the TX processor 316, or the controller/processor 375 executing the priority scheduling component 120 or the decoding component 128 may provide means for receiving the second uplink transmission in the first uplink capable slot based on the first priority level and the second priority level.

At block 1260, the method 1200 may optionally include receiving the first UCI transmission in a second uplink capable slot subsequent to the first uplink capable slot. In some implementations, for example, base station 102, the TX processor 316, or the controller/processor 375 may execute the priority scheduling component 120 or the decoding component 128 to receive the first UCI transmission in a second uplink capable slot subsequent to the first uplink capable slot. Accordingly, the base station 102, the TX processor 316, or the controller/processor 375 executing the priority scheduling component 120 or the decoding component 128 may provide means for receiving the first UCI transmission in a second uplink capable slot subsequent to the first uplink capable slot.

At block 1270, the method 1200 may optionally include determining that the first UCI transmission has been dropped. In some implementations, for example, base station 102, the TX processor 316, or the controller/processor 375 may execute the priority scheduling component 120 or the dropping component 910 to determine that the first UCI transmission has been dropped. Accordingly, the base station 102, the TX processor 316, or the controller/processor 375 executing the priority scheduling component 120 or the dropping component 910 may provide means for determining that the first UCI transmission has been dropped.

The following provides an overview of aspects of the present disclosure:

Aspect 1: A method of wireless communication, comprising: receiving a first semi-persistent scheduling (SPS) configuration including an indication of resources for acknowledgment (ACK) reporting as uplink control information (UCI), the first SPS configuration indicating a first priority level; receiving a second signaling indicating a second priority level for a second transmission, the second priority level being higher than the first priority level; deferring a first UCI transmission according to the first SPS configuration during one or more downlink slots to a first uplink capable slot subsequent to the one or more downlink slots, the first UCI transmission in the first uplink capable slot collides with the second transmission; and transmitting the second transmission in the first uplink capable slot based on the second priority level being higher than the first priority level.

Aspect 2: The method of Aspect 1, further including dropping the first UCI transmission.

Aspect 3: The method of Aspect 1, further comprising deferring the first UCI to a second uplink capable slot subsequent to the first uplink capable slot.

Aspect 4: The method of any of Aspects 1-3, wherein the second signaling for the second transmission is a second SPS configuration including an indication of resources for ACK reporting as a second UCI.

Aspect 5: The method of Aspect 4, further comprising deferring the second transmission for the second UCI during the one or more downlink slots.

Aspect 6: The method of any of Aspects 1-3, wherein the second transmission is a high priority physical layer transmission.

Aspect 7: The method of any of Aspects 1-3, or 6, wherein the second transmission is dynamically scheduled or scheduled by a radio resource control (RRC) message.

Aspect 8: The method of Aspect 7, wherein the second transmission is one of: a RRC configured high priority channel state information (CSI) report, a RRC configured high priority configured grant physical uplink shared channel (PUSCH); a high priority dynamically scheduled PUSCH; or a deferred high priority uplink transmission.

Aspect 9: A method of wireless communication, comprising: transmitting a first semi-persistent scheduling (SPS) configuration including an indication of resources for acknowledgment (ACK) reporting as uplink control information (UCI), the first SPS configuration indicating a first priority level; transmitting a second signaling indicating a second priority level for a second uplink transmission, the second priority level being higher than the first priority level; determining that a first UCI transmission according to the first SPS configuration during one or more downlink slots is deferred to a first uplink capable slot subsequent to the one or more downlink slots that collides with the second uplink transmission; and receiving the second uplink transmission in the first uplink capable slot based on the first priority level and the second priority level.

Aspect 10: The method of Aspect 9, further comprising determining that the first UCI transmission has been dropped.

Aspect 11: The method of Aspect 9, further comprising receiving the first UCI transmission in a second uplink capable slot subsequent to the first uplink capable slot.

Aspect 12: The method of any of Aspects 9-11, wherein the second signaling for the second transmission is a second SPS configuration including an indication of resources for ACK reporting as a second UCI.

Aspect 13: The method of Aspect 12, further comprising determining that the second transmission for the second UCI has been deferred during the one or more downlink slots.

Aspect 14: The method of any of Aspects 9-11, wherein the second transmission is a high priority physical layer transmission.

Aspect 15: The method of any of Aspects 9-11, or 14, wherein the second transmission is dynamically scheduled or scheduled by a radio resource control (RRC) message.

Aspect 16: The method of Aspect 15, wherein the second transmission is one of: a RRC configured high priority channel state information (CSI) report, a RRC configured high priority configured grant physical uplink shared channel (PUSCH); a high priority dynamically scheduled PUSCH; or a deferred high priority uplink transmission.

Aspect 17: An apparatus for wireless communication, comprising: a transceiver; a memory storing computer-executable instructions; and a processor coupled with the transceiver and the memory and configured to execute the computer-executable instructions to perform the method of any of Aspects 1-8.

Aspect 18: An apparatus for wireless communication, comprising: means for performing the method of any of Aspects 1-8.

Aspect 19: A non-transitory computer-readable medium storing computer executable code, the code when executed by a processor causes the processor to perform the method of any of Aspects 1-8.

Aspect 20: An apparatus for wireless communication, comprising: a transceiver; a memory storing computer-executable instructions; and a processor coupled with the transceiver and the memory and configured to execute the computer-executable instructions to perform the method of any of Aspects 8-16.

Aspect 21: An apparatus for wireless communication, comprising: means for performing the method of any of Aspects 8-16.

Aspect 22: A non-transitory computer-readable medium storing computer executable code, the code when executed by a processor causes the processor to perform the method of any of Aspects 8-16.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of wireless communication, comprising:
receiving a first semi-persistent scheduling (SPS) configuration including an indication of resources for acknowledgment (ACK) reporting of a first downlink reception as uplink control information (UCI), the first SPS configuration indicating a first priority level;
receiving a second signaling indicating a second priority level for a second transmission, the second priority level being higher than the first priority level;
deferring a first UCI transmission according to the first SPS configuration during one or more downlink slots from the resources to a first uplink capable slot subsequent to the one or more downlink slots, the deferred first UCI transmission in the first uplink capable slot collides with the second transmission; and
transmitting the second transmission in the first uplink capable slot based on the second priority level being higher than the first priority level.

2. The method of claim 1, further comprising dropping the first UCI transmission.

3. The method of claim 1, wherein the second signaling for the second transmission is a second SPS configuration including an indication of resources for ACK reporting as a second UCI.

4. The method of claim 3, further comprising deferring the second transmission for the second UCI during the one or more downlink slots.

5. The method of claim 1, wherein the second transmission is a high priority physical layer transmission.

6. The method of claim 1, wherein the second transmission is dynamically scheduled or scheduled by a radio resource control (RRC) message.

7. The method of claim 6, wherein the second transmission is one of: a RRC configured high priority channel state information (CSI) report, a RRC configured high priority configured grant physical uplink shared channel (PUSCH); a high priority dynamically scheduled PUSCH; or a deferred high priority uplink transmission.

8. A method of wireless communication, comprising:
transmitting a first semi-persistent scheduling (SPS) configuration including an indication of resources for acknowledgment (ACK) reporting of a first downlink transmission as uplink control information (UCI), the first SPS configuration indicating a first priority level;

transmitting a second signaling indicating a second priority level for a second uplink transmission, the second priority level being higher than the first priority level;

determining that a first UCI transmission according to the first SPS configuration during one or more downlink slots is deferred from the resources to a first uplink capable slot subsequent to the one or more downlink slots, the deferred first UCI transmission collides with the second uplink transmission; and receiving the second uplink transmission in the first uplink capable slot based on the first priority level and the second priority level.

9. The method of claim 8, further comprising determining that the first UCI transmission has been dropped.

10. The method of claim 8, wherein the second signaling for the second uplink transmission is a second SPS configuration including an indication of resources for ACK reporting as a second UCI.

11. The method of claim 10, further comprising determining that the second uplink transmission for the second UCI has been deferred during the one or more downlink slots.

12. The method of claim 8, wherein the second uplink transmission is a high priority physical layer transmission.

13. The method of claim 8, wherein the second uplink transmission is dynamically scheduled or scheduled by a radio resource control (RRC) message.

14. The method of claim 13, wherein the second uplink transmission is one of: a RRC configured high priority channel state information (CSI) report, a RRC configured high priority configured grant physical uplink shared channel (PUSCH); a high priority dynamically scheduled PUSCH; or a deferred high priority uplink transmission.

15. An apparatus for wireless communication, comprising:

a transceiver;

a memory storing computer-executable instructions; and a processor coupled with the transceiver and the memory and configured to execute the computer-executable instructions to:

receive a first semi-persistent scheduling (SPS) configuration including an indication of resources for acknowledgment (ACK) reporting of a first downlink reception as uplink control information (UCI), the first SPS configuration indicating a first priority level;

receive a second signaling indicating a second priority level for a second transmission, the second priority level being higher than the first priority level;

defer a first UCI transmission according to the first SPS configuration during one or more downlink slots from the resources to a first uplink capable slot subsequent to the one or more downlink slots, the first UCI transmission in the first uplink capable slot collides with the second transmission; and transmit the second transmission in the first uplink capable slot based on the second priority level being higher than the first priority level.

16. The apparatus of claim 15, wherein the processor is configured to drop the first UCI transmission.

17. The apparatus of claim 15, wherein the second signaling for the second transmission is a second SPS configuration including an indication of resources for ACK reporting as a second UCI.

18. The apparatus of claim 17, further comprising deferring the second transmission for the second UCI during the one or more downlink slots.

19. The apparatus of claim 15, wherein the second transmission is a high priority physical layer transmission.

20. The apparatus of claim 15, wherein the second transmission is dynamically scheduled or scheduled by a radio resource control (RRC) message.

21. The apparatus of claim 20, wherein the second transmission is one of: a RRC configured high priority channel state information (CSI) report, a RRC configured high priority configured grant physical uplink shared channel (PUSCH); a high priority dynamically scheduled PUSCH; or a deferred high priority uplink transmission.

22. An apparatus for wireless communication, comprising:

a transceiver;

a memory storing computer-executable instructions; and a processor coupled with the transceiver and the memory and configured to execute the computer-executable instructions to:

transmit a first semi-persistent scheduling (SPS) configuration including an indication of resources for acknowledgment (ACK) reporting of a first downlink transmission as uplink control information (UCI), the first SPS configuration indicating a first priority level;

transmit a second signaling indicating a second priority level for a second uplink transmission, the second priority level being higher than the first priority level;

determine that a first UCI transmission according to the first SPS configuration during one or more downlink slots is deferred to a first uplink capable slot subsequent to the one or more downlink slots, the deferred first UCI collides with the second uplink transmission; and receive the second uplink transmission in the first uplink capable slot based on the first priority level and the second priority level.

23. The apparatus of claim 22, wherein the processor is configured to determine that the first UCI transmission has been dropped.

24. The apparatus of claim 22, wherein the second signaling for the second uplink transmission is a second SPS configuration including an indication of resources for ACK reporting as a second UCI.

25. The apparatus of claim 24, further comprising determining that the second uplink transmission for the second UCI has been deferred during the one or more downlink slots.

26. The apparatus of claim 22, wherein the second uplink transmission is a high priority physical layer transmission.

27. The apparatus of claim 22, wherein the second uplink transmission is dynamically scheduled or scheduled by a radio resource control (RRC) message.

28. The apparatus of claim 27, wherein the second uplink transmission is one of: a RRC configured high priority channel state information (CSI) report, a RRC configured high priority configured grant physical uplink shared channel (PUSCH); a high priority dynamically scheduled PUSCH; or a deferred high priority uplink transmission.

* * * * *